Feb. 4, 1930.  H. A. COULTER  1,745,659
AUTOMOBILE SIGNALING DEVICE
Filed Dec. 1, 1928
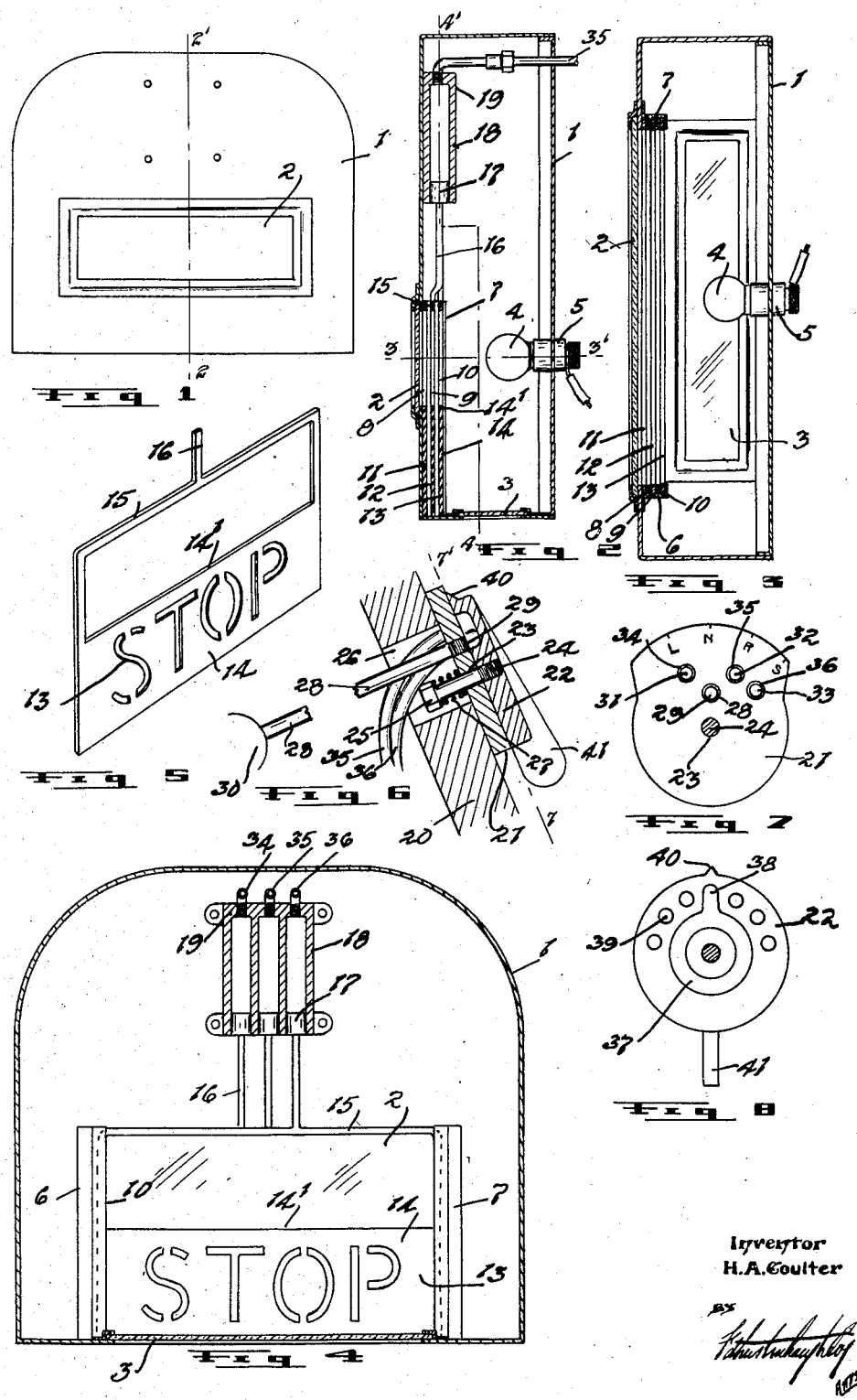
Inventor
H. A. Coulter Patented Feb. 4, 1930

1,745,659

UNITED STATES PATENT OFFICE

HUGH A. COULTER, OF WINNIPEG, MANITOBA, CANADA

AUTOMOBILE SIGNALING DEVICE

Application filed December 1, 1928, Serial No. 323,026, and in Canada November 13, 1928.

The invention relates to improvements in automobile signaling devices and an object of the invention is to provide a simply constructed and easily operated appliance which will permit the driver of an automobile to effect a signal which will positively indicate to a following driver whether he is going to stop or make a turn to the right or left.

A further object is to construct the appliance so that it can be positively relied upon and so that each signal when actuated will be illuminated and clearly visible, the operation of the several signals being directly under the control of the driver from his seat.

A further object of the invention is to provide a signaling device wherein the several signals are actuated by air and controlled by a valve located within convenient range of the driver's seat.

With the above more important objects in view, the invention consists essentially in the arrangement and construction of parts hereinafter more particularly described, reference being had to the accompanying drawing, in which:—

Fig. 1 is a rear view of the signal.

Fig. 2 is an enlarged detailed vertical sectional view at 2—2′ Figure 1.

Fig. 3 is a horizontal sectional view at 3—3′ Figure 2.

Fig. 4 is a vertical sectional view at 4—4′ Figure 2.

Fig. 5 is a perspective view of one of the signal plates.

Fig. 6 is an enlarged detailed vertical sectional view centrally through the valve employed, certain parts being shown in side elevation.

Fig. 7 is a sectional view at 7—7′ Figure 6 and looking towards the base of the valve.

Fig. 8 is an inverted view of the valve disc.

In the drawing like characters of reference indicate corresponding parts in the several figures.

The box or casing 1 of the signaling device is preferably formed of metal and it is provided towards the bottom and at the back with a substantially rectangular window or sight opening 2 which is preferably a red glass so that when the same is illuminated and not covered by a signal plate, it will serve as the conventional red tail signal used on automobiles at the rear.

The bottom of the box is provided with a further transparent window 3 formed from clear glass and through which the customary automobile license plate is illuminated when the conventional electric lamp 4 is inserted, the lamp being carried by a supporting socket 5 mounted on the front of the box, it being understood that the front of the box is considered as that which is facing forwardly when the device is placed on the automobile. The lamp 4 is located centrally to the rear of the window 2 so that a red light shows when the said window is not covered by a signal plate as later described.

Adjoining the ends of the window 2, I locate an opposing pair of guide plates 6 and 7 which are herein shown as bent to provide opposing pairs of vertical channels 8, 9 and 10. In the pairs of channels, I mount for vertical sliding movement similar signaling plates 11, 12 and 13 and these plates each present a substantially rectangular body portion 14 from which extends a bail 15, the cross portions of the bail being provided with a supporting member in the form of a rod 16. Normally the signal plates rest on the bottom of the box, being positioned one behind the other and at such time, the upper edge 14′ of the body part of the plate is in line with or below the lower side of the window 2 so that it will not be seen and the bail spans the window.

The body part of each plate has portions thereof stamped out to form letters and these stamped out letters spell desired signals. In Figure 5, I have shown the body of the plate as stamped out to indicate "stop" and obviously upon this plate being raised to a position directly behind the window, the light shining through the cut out portions of the plate will give the signal "stop" to a following automobile driver, such word appearing in red due to the red coloured glass of the window 2. The other two signal plates shown will be stamped out with letters so that they will read respectively "right" and "left" and as the stamping of these letters is done in the same manner as indicated on the "stop" signal plate shown in Figure 5, I have not considered it necessary to separately show them.

In order to selectively raise the signaling plates to their position opposing the window 2, I have used plungers and air cylinders, the plungers being actuated by the air in a manner later described to selectively raise the signaling plates. The rods 16 are each provided on their upper ends with plungers or pistons 17, the rods being bent in order to allow the pistons to be transversely aligned within the box. The pistons operate slidably within cylinders 18, the cylinders being formed by boring similar cylinder forming holes in a base block 19 provided, the block being permanently fastened in any suitable manner to the rear side of the casing.

The stroke of each plunger within its cylinder is such that when the plunger is down, the signal plate will be resting on the bottom of the box and such that when fully up, the signaling plate will be directly opposing the window 2.

On the dash 20 or other selected stationary part of the automobile and within convenient range of the driver, I have located an air controlling valve which embodies a stationary base plate 21 and a rotating disc 22. The base plate is suitably fastened to the dash and provided with a central opening 23 through which a bolt 24 rotatably passes, the one end of the bolt being screw threaded or otherwise firmly fastened to the disc and the other end being provided with a head 25. A hole 26 is formed in the dash to receive the screw and air pipes later described and a coiled spring 27 is placed on the screw between the plate 21 and the head 25 and normally holds the disc pressed tightly against the plate but permits rotation of the disc in respect to the plate.

A pipe 28 communicates with a port 29 in the base plate 21 and this pipe leads to say the intake manifold 30 of an automobile engine. I provide also in the present embodiment of the invention, three other ports 31, 32 and 33 in the base plate 21, such ports being concentric to the bolt 24. Three pipes 34, 35 and 36 lead from the ports 31, 32 and 33 to the several cylinders 18, the several pipes passing out through the hole 26.

The disc 22 is provided on the under side with a circular slot 37 which is adapted to be at all times in communication with the port 29 of the base plate and the slot is provided with an offset duct 38 which is adapted in the rotation of the disc to sweep over the base plate and register with one or other of the ports 31, 32 and 33 as selected.

The disc is provided also with a further series of equally spaced ports 39 and the arrangement is such that when the offset 38 is in communication with a selected port say that 31, the other two ports 32 and 33 are open to atmosphere through certain of the holes 39 registering therewith.

The disc is provided opposite the offset 38 with a pointer 40 and with a manipulating handle 41 and the base plate is supplied with graduation marks radially opposite the ports 31, 29, 32 and 33 and the graduation marks have the letters "L," "N," "R" and "S" associated therewith, such letters indicating "left," "neutral," "right" and "stop" respectively and the arrangement being such that when the pointer 40 is opposite any one of the graduation marks, the signal corresponding to that graduation indication such as "stop" will be indicated.

According to the above it will be obvious that when the indicating pointer 40 is set at "N" or neutral marking, there will be no signal plate actuated and the indicator will simply show the customary red tail light. On the other hand, should the indicating pointer 40 be turned to the indicating mark "L" on the plate, the pipe 28 will be connected through the port 29, slot 37, offset 38 and port 31 with the pipe 34 and accordingly the suction of the automobile engine will cause the raising of the plunger associated with the indicating plate having the signal "left" thereon and such signal will be immediately visible through the window 2. At such time the ports 32 and 33 are open to atmosphere through the ports 39.

Whilst I have described the invention wherein air suction of vacuum is utilized to selectively actuate the pistons or plungers in the cylinders, it will be readily understood that air under pressure could as readily be used to effect the shifting of the pistons in their cylinders at the selected times.

What I claim as my invention is:—

1. In a signaling device, a casing having a window in the rear thereof, a plurality of signal plates positioned one behind the other and normally non-visible through the window and mounted for vertical sliding movement in a direction across the window, an air cylinder for each signal plate, said cylinders being above the plates and permanently carried by the casing, a plunger operatively mounted in each cylinder and directly connected to one of the underlying signal plates and means controlled from a distant point for selectively exhausting the air from a desired cylinder to effect the shifting of a desired plate into a position opposing the window.

2. In a signaling device, a casing having a window in the rear thereof, a plurality of signal plates positioned one behind the other and normally non-visible through the window and mounted for vertical sliding movement in a direction across the window, an air cylinder for each signal plate positioned above the windows and carried by the casing, a plunger operatively mounted in each cylinder and directly connected to one of the underlying signal plates, means controlled from a distant point for selectively exhausting the air from a desired cylinder to effect the up shifting of a desired plate into a position opposing the window and an illuminating lamp mounted within the casing to the rear of the window.

3. In a signaling device, a casing having a window in the rear thereof, a plurality of signal plates positioned one behind the other and normally non-visible in a location beneath the window, said plates being mounted for vertical sliding movement in a direction across the window and being each provided with a bail bar spanning the window, a vertically disposed air cylinder for each signal plate positioned above the window and carried by the casing, a plunger operably mounted in each cylinder, a rod directly connecting each plunger to a bail bar and means operated from a distant point for selectively discharging the air from a desired cylinder to effect the up shifting of a desired plate into an exposed position opposing the window.

Signed at Winnipeg, this 30 day of August, 1928.

HUGH A. COULTER.